(12) United States Patent
Johnson et al.

(10) Patent No.: US 6,233,650 B1
(45) Date of Patent: *May 15, 2001

(54) USING FET SWITCHES FOR LARGE MEMORY ARRAYS

(75) Inventors: Brian P. Johnson; Dave Freker, both of Folsom, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,258

(22) Filed: Apr. 1, 1998

(51) Int. Cl.$^7$ ................................................. G06F 12/00

(52) U.S. Cl. .............................................. 711/5; 365/189.02

(58) Field of Search .................................. 711/2, 5, 157, 711/127, 128, 104, 173; 716/126, 131, 132; 365/230.03, 230.04, 189.02; 327/408

(56) References Cited

U.S. PATENT DOCUMENTS

| 3,654,394 | * | 4/1972 | Gordon | 327/408 |
| 4,513,368 | * | 4/1985 | Houseman | 711/5 |
| 4,645,944 | * | 2/1987 | Uya | 327/410 |
| 4,985,703 | * | 1/1991 | Kaneyama | 327/408 |
| 5,261,068 | * | 11/1993 | Gaskins et al. | 711/157 |
| 5,289,062 | * | 2/1994 | Wyland | 327/427 |

* cited by examiner

Primary Examiner—Do Hyun Yoo
Assistant Examiner—Yamir Encarnación
(74) Attorney, Agent, or Firm—Blakely, Sokoloff, Taylor & Zafman LLP

(57) ABSTRACT

The present invention discloses a method and apparatus for interfacing a memory array to a memory controller using a field-effect transistor (FET) switch. The memory controller has a bus which comprises a plurality of signal lines. The memory array is coupled to the memory controller. The memory array is divided into N groups of memory devices; each group has K memory devices. K memory devices in each of the N groups share memory signal lines. The FET switch couples the bus to one of the N groups of the shared memory signal lines at different times in response to a switch control indication.

20 Claims, 4 Drawing Sheets

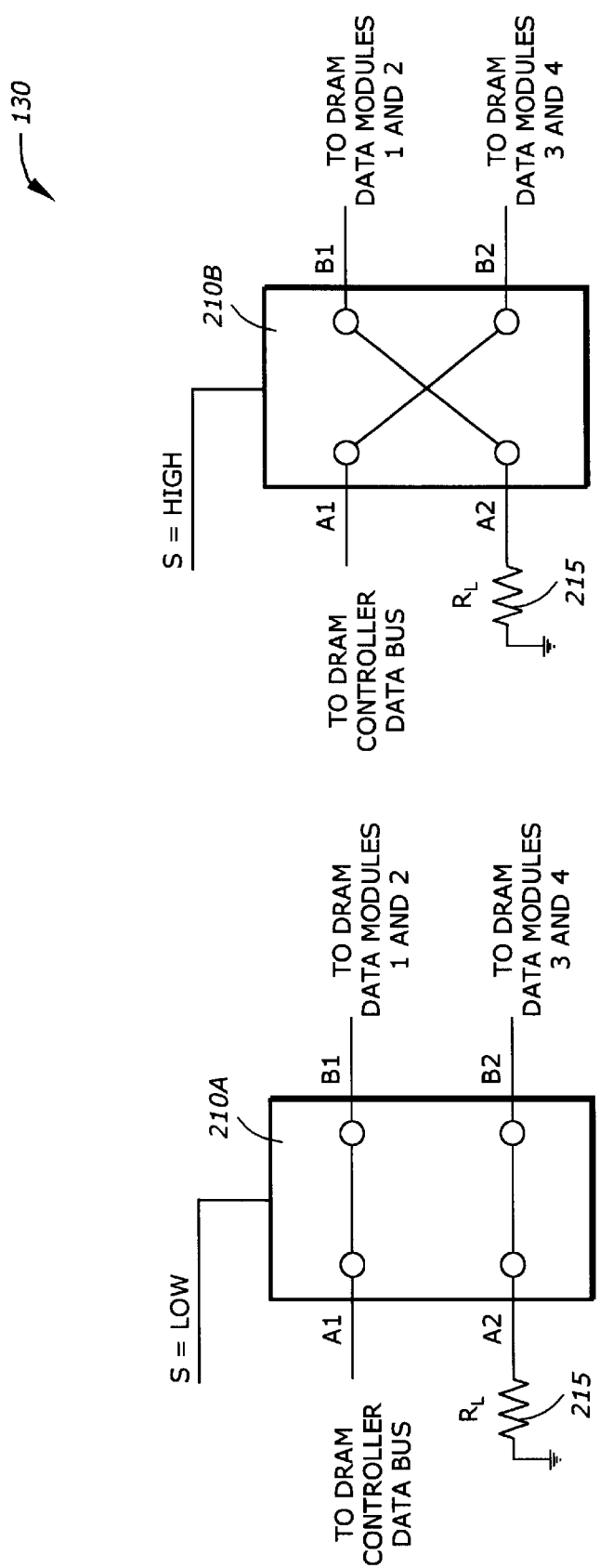

USING FET SWITCHES FOR LARGE MEMORY ARRAYS

BACKGROUND OF THE INVENTION

1. Field of the Invention

This invention relates to microprocessor systems. In particular, the invention relates to use of field-effect transistor (FET) switches for large memory arrays.

2. Description of Related Art

High performance microprocessor systems typically involve a large number of high speed memories. Interfacing these memories to the processor typically includes connecting all the data lines of the memory devices to the processor's data bus lines. Connecting a large number of data lines to the processor's data bus creates a number of problems. The major problem is the high capacitive load caused by a large number of data lines tied together. Four dynamic random access memory (DRAM) modules can have up to 80 picofarads (pf) on the data lines typically. A large capacitive loading incurs long delay time along the signal lines. At high frequencies, the delay time causes unacceptable performance. Another problem is the high power consumption caused by the output drivers. Since input/output (I/O) buffer power is directly related to the capacitive load, a high capacitive loading results in high power consumption. Lastly, the large capacitive loading limits the flexibility of running the signal traces on a printed circuit board.

Therefore there is a need in the technology to provide an efficient method and apparatus to interface a large memory array to a high-performance processor.

SUMMARY OF THE INVENTION

The present invention discloses a method and apparatus for interfacing a memory array to a memory controller using a field-effect transistor (FET) switch. The memory controller has a bus which comprises a plurality of signal lines. The memory array is coupled to the memory controller. The memory array is divided into N groups of memory devices; each group has K memory devices. K memory devices in each of the N groups share memory signal lines. The FET switch couples the bus to one of the N groups of the shared memory signal lines at different times in response to a switch control indication.

BRIEF DESCRIPTION OF THE DRAWINGS

The features and advantages of the present invention will become apparent from the following detailed description of the present invention in which:

FIG. 2A is a diagram illustrating one embodiment of a FET switch showing connections between the DRAM controller data bus to the DRAM modules 1 and 2.

FIG. 2B is a diagram illustrating one embodiment of a FET switch showing connections between the DRAM controller data bus to the DRAM modules 3 and 4.

DESCRIPTION OF THE PRESENT INVENTION

A method and apparatus for interfacing a large memory array to a processor is described. The memory array is divided into groups of memories to distribute the loading. The data bus of each group is coupled to the processor's data bus via a field effect transistor (FET) switch. This reduces capacitance loading which results in high speed memory accesses.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
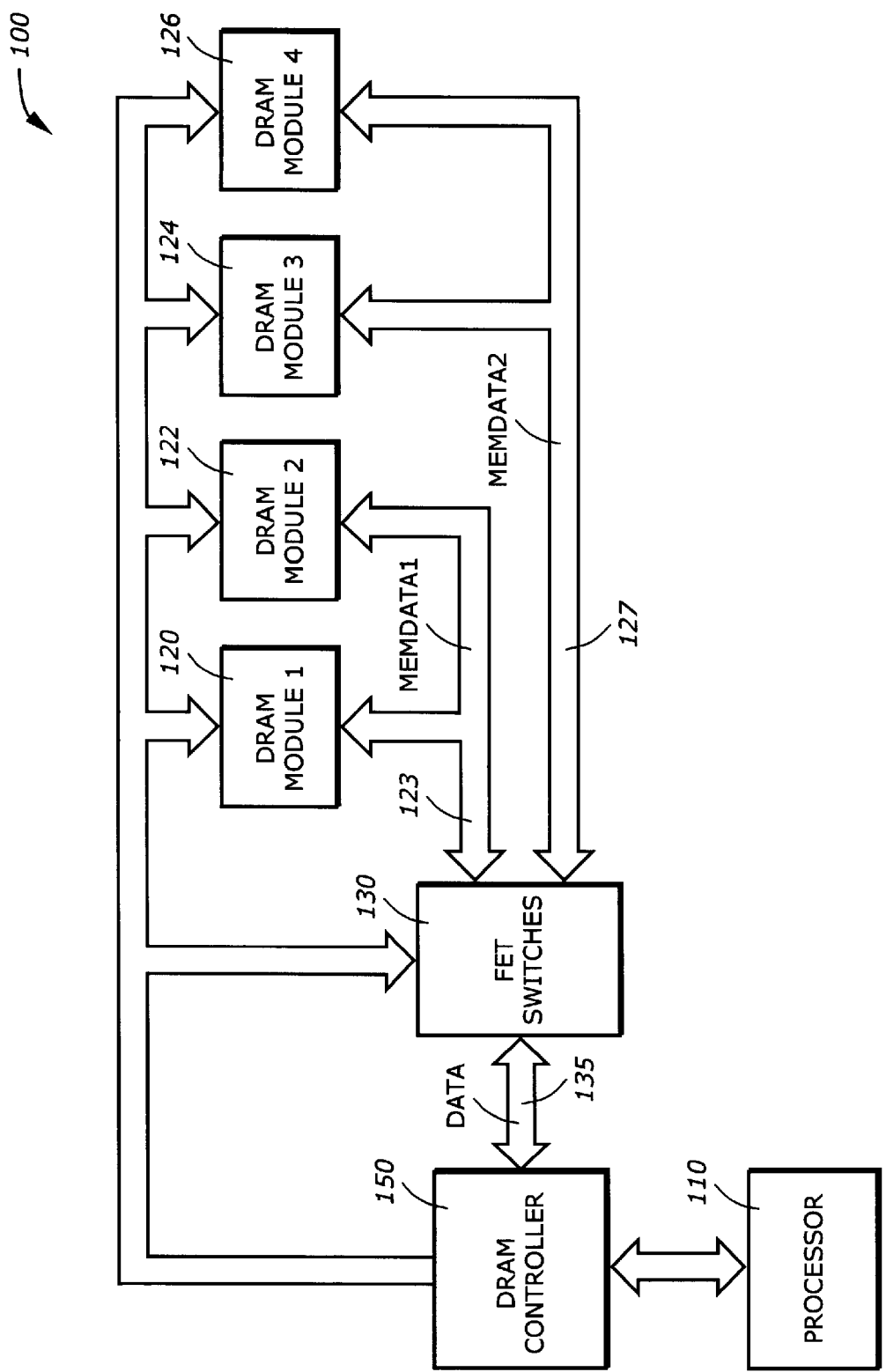
FIG. 1 is a diagram illustrating one embodiment of a system 100 in accordance with the teachings of the present invention.

FIG. 1 is a diagram illustrating one embodiment of a system 100 in accordance with the teachings of the present invention. The system 100 includes a processor 110, four dynamic random access memory (DRAM) modules 120, 122, 124, and 126, a FET switch 130, a DRAM controller data bus 135, memory data buses 123 and 127, and a DRAM controller 150.

The processor 110 may be any high performance processor. In one embodiment, the processor 110 is a general purpose microprocessor. In another embodiment, the processor 110 is an advanced graphics controller. The processor 110 has a number of address lines, data lines, and control lines. For clarity, FIG. 1 shows only a bus connecting the processor 110 to the DRAM controller 150.

The DRAM controller 150 generates control signals to DRAM devices. In one embodiment, the DRAM controller 150 comprises a circuit. These control signals are used to perform a number of control functions such as refresh, RAS# and CAS# control, page mode, etc., which are well known in the art. While one exemplary embodiment is shown having the DRAM controller 150 separated from the processor 110, alternative embodiments may have the DRAM controller 150 integrated with the processor 110. In addition, the DRAM controller 150 merely represents one type of memory controllers. Other memory devices that may be used include static RAM, video RAM, flash memories, or any other types of memory devices.

Each of the four memory modules 120, 122, 124, and 126 may be any type of DRAM module. In one embodiment, each of four DRAM modules 120, 122, 124, and 126 is a DIMM DRAM module operating at fast access times. The typical access times are 40 nsec to 80 nsec. As shown in FIG. 1, the data lines of the DRAM module 1 (120) and the DRAM module 2 (122) are connected together to form the MEMDATA1 bus 123. Similarly, the data lines of the DRAM module 3 (124) and the DRAM module 4 (126) are connected together to form the MEMDATA2 bus 127. As is known by one skilled in the art, the number of DRAM modules and the exact arrangement of the modules can be changed according to the system requirements or the desires of the manufacturer.

The set of switches 130 includes a number of FET switches. Each of the FET switches is connected to each of the memory data lines. The switches 130 are bi-directional switches with low on resistance. Low on resistance FET switches incur very little, close to zero, propagation delay. In one embodiment, the switches 130 are the FET switches Part number QS16212, manufactured by Quality Semiconductor at Santa Clara, Calif.

The FET switches are used to connect the data lines of the DRAM modules to the data lines of the DRAM controller 150. The data lines of the DRAM modules are grouped into groups. In the example shown in FIG. 1, the DRAM data lines are grouped into two groups: the MEMDATA1 bus 123 and the MEMDATA2 bus 127. In each group, the data lines are tied together to form a module data bus. Since the number of data lines that are tied together is significantly reduced, the capacitive loading is proportionally reduced. This reduction of capacitive loading offers a number of advantages. First, the memory access time is significantly improved because the time delay caused by capacitive loading is reduced. Since the FET switches have very low on resistance, they incur negligible delay. Second, the routing of the data lines on a printed circuit board can be made with longer traces due to the reduced capacitive loading. Routing flexibility is important for high density boards. Third, the power consumption is reduced because the input/output (I/O) buffer power is directly related to the capacitive load driven, as given by the equation below:

$$P=CV^2f \quad (1)$$

where C is the capacitance, V is the voltage, and f is the frequency.

The use of the FET switches as the data switching elements also allows larger memory arrays to be used. This is especially useful for applications requiring a large amount of memory such as graphics and multimedia.

The FET switches need only one control signal to switch the connections. This control signal may be generated as part of the address decoding. Typically memory modules are mapped into the processor's address space. Dividing memory modules into groups corresponds to dividing the memory address space into smaller address spaces. Therefore, the switch control signal is easily derived from the address decoding circuit.

FIG. 2A is a diagram illustrating one embodiment of a FET switch 130 showing connections between the DRAM controller data bus to the DRAM modules 1 and 2.

The FET switch 130 is a dual-line bi-directional switch, having two connections on each side. As shown in FIG. 2A, the FET switch 130 has connection points A1 and A2 on one side, and connection points B1 and B2 on another side. In one embodiment, the A1 point is connected to a data line of the DRAM controller 150, the A2 point is connected to the ground via a bus keeper, e.g., a load resistor RL, 215, the B1 point is connected to the data lines from the DRAM modules 1 and 2, and the B2 point is connected to the data lines from the DRAM modules 3 and 4. The bus keeper is an element to keep an input of a MOS (e.g., CMOS) device connected to a stable power source such as ground or supply voltages. This avoids leaving the input floating.

The FET switch 130 is controlled by the S control signal. As discussed before, the S control signal is typically derived from the address decoding circuit. The S control signal is typically generated from the DRAM controller 150 or other decoding circuit. When S is low, the A1 point is connected to the B1 point and the A2 point is connected to the B2 point. In this mode, the MEMDATA1 bus 123 (FIG. 1) is connected to the DRAM controller data bus 135 (FIG. 1).

FIG. 2B is a diagram illustrating one embodiment of a FET switch showing connections between the DRAM controller data bus to the DRAM modules 3 and 4.

In the configuration shown in FIG. 2B, the control signal S is high. The DRAM data lines of modules 1 and 2 are connected to the bus keeper load resistor $R_L$ 215 and the data lines of the DRAM modules 3 and 4 are connected to the DRAM controller data lines. In this mode, the DRAM controller accesses data from the DRAM modules 3 and 4 because the MEMDATA2 bus 127 (FIG. 1) is connected to the DRAM controller data bus 135 (FIG. 1).

Typically the DRAM modules are mapped according to some addressing mapping scheme. In one embodiment, the DRAM modules 120, 122, 124, and 126 are mapped based on the address space of the processor. For example, modules 1 and 2 correspond to a lower address space while modules 3 and 4 correspond to an upper address space. In this mapping scheme, the address decoder which decodes the processor's address bus gates one of the address lines to the S control line of the FET switch (FIGS. 2A and 2B). In this manner, when this gated/decoded address line changes from 0 to 1 the DRAM data lines are switched from modules 1 and 2 to modules 3 and 4. Similarly, when this gated/decoded address line changes from 1 to 0 the DRAM data lines are switched from modules 3 and 4 to modules 1 and 2.

Figure 3A:
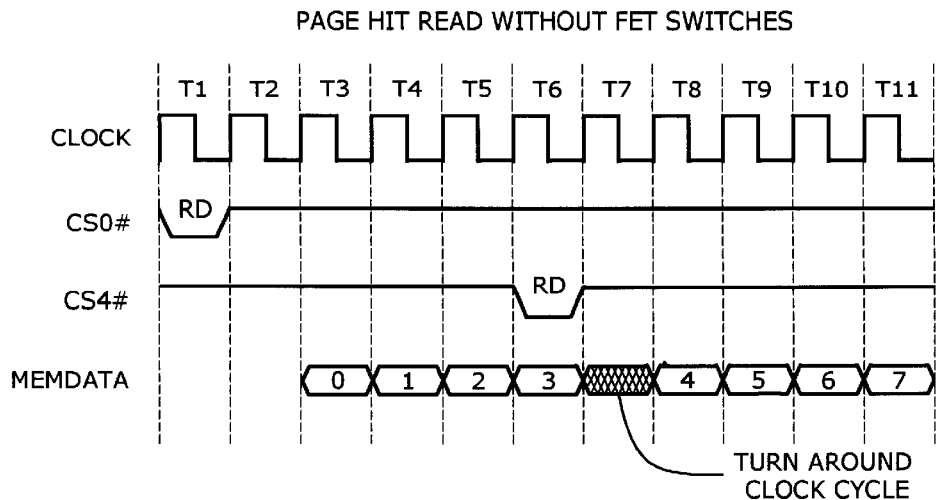
FIG. 3A is a timing diagram illustrating a page read hit without the FET switches.

FIG. 3A is a timing diagram illustrating a page read hit without the FET switches. This timing diagram is used for illustrative purpose only. The exact relationship between the clock signal, the chip select signals, and the memory data is not shown.

The timing diagram shown in FIG. 3A has four signals: CLOCK, CS0#, CS4#, and MEMDATA. The CLOCK signal is shown as the reference synchronizing signal. The CLOCK signal has a number of clock cycles from T1 through T11. The CS0# signal is the Chip Select 0 signal. The CS4# signal is the Chip Select 4 signal. For clarity, not all of the chip select signals are shown. Other chip select signals are CS1#, CS2#, CS3#, CS5#, CS6#, and CS7#. The CS0#, CS1#, CS2#, and CS3# signals correspond to the DRAM modules 1 and 2 while the CS4#, CS5#, CS6#, and CS7# signals correspond to the DRAM modules 3 and 4. The MEMDATA corresponds to the data signals as read out from the DRAM modules.

As shown in FIG. 3A, when the CS4# is asserted at clock T6 to select the DRAM modules 3 and 4, there is a turn around clock cycle due to the bank switching of the DRAM modules. This turn around clock cycle incurs a delay as shown at the clock cycle T7.

Figure 3B:
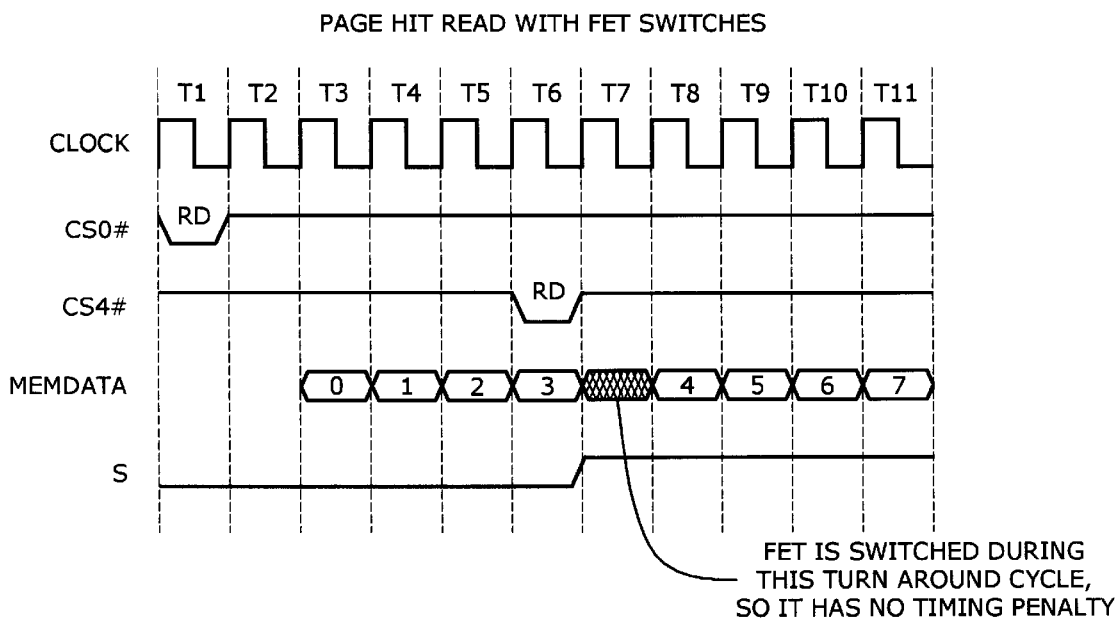
FIG. 3B is a timing diagram illustrating a page read hit with the FET switches.

FIG. 3B is a timing diagram illustrating a page read hit with the FET switches. The signals shown in FIG. 3B are essentially the same as those shown in FIG. 3A. The S signal corresponds to the switch control signal to switch the FET switches.

As shown in FIG. 3B, when S goes LOW to HIGH at the beginning of clock T7, switching the data lines from the DRAM modules 1 and 2 to modules 3 and 4, there is a delay time caused by the switching time. Note that the CS4# is still asserted at clock T6. The delay caused by the FET switching coincides with the turn around time at clock T7. Therefore, the FET switching incurs no additional delay time since its delay time is absorbed within the turn around time caused by the DRAM bank switching.

FIGS. 3A and 3B, therefore, show that the use of the FET switches incurs no time penalty for read cycles.

Figure 4A:
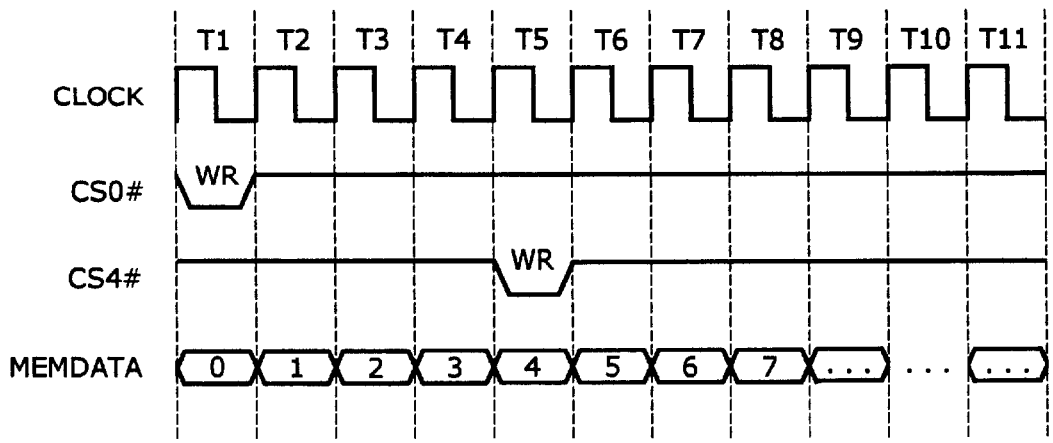
FIG. 4A is a timing diagram illustrating a page write hit without the FET switches.

FIG. 4A is a timing diagram illustrating a page write hit without the FET switches. The signals CLOCK, CS0#, CS4# and MEMDATA are essentially the same as discussed in FIGS. 3A and 3B.

For write cycles, however, the memory data are presented before the low to high transitions of the corresponding write signal or chip select signal. The write data set up and hold time are to be met to ensure a successful write. As shown in FIG. 4A, the MEMDATA 0, 1, 2, 3, 4, 5, 6, and 7 are presented at clocks T1, T2, T3, T4, T5, T6, T7, and T8, respectively. For write mode without the FET switches, there is no turn around time.

Figure 4B:
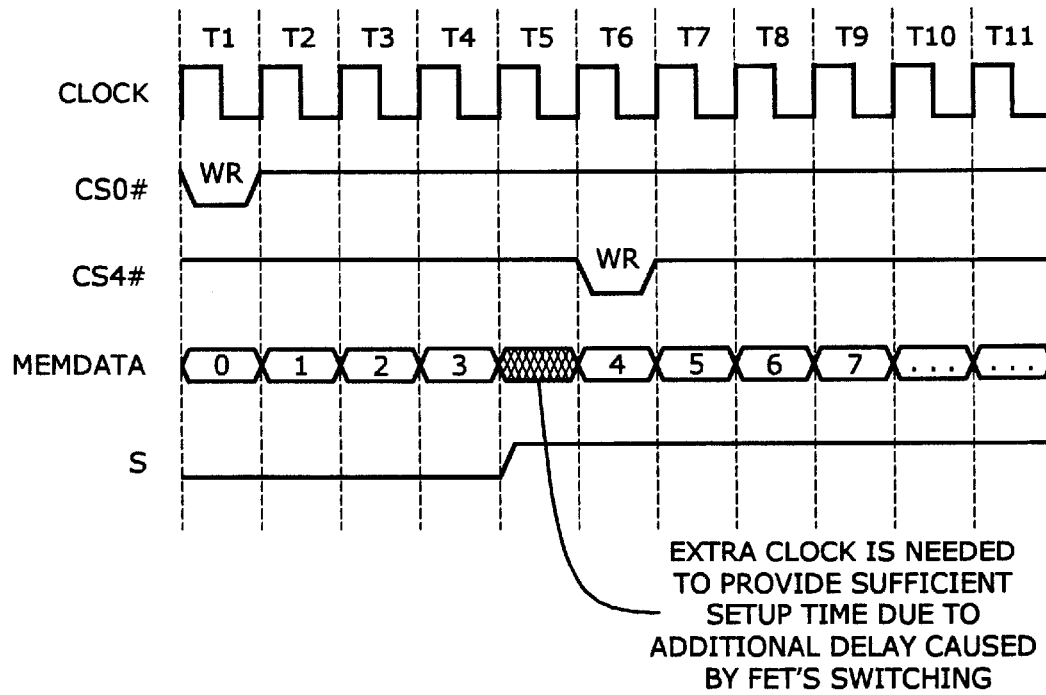
FIG. 4B is a timing diagram illustrating a page write hit with the FET switches.

FIG. 4B is a timing diagram illustrating a page write hit with the FET switches. As before, the signals CLOCK, CS0#, CS4#, MEMDATA, and S are the same as discussed in FIG. 3B. The S signal transitions from LOW to HIGH at the clock T5 to switch the DRAM modules 1 and 2 to modules 3 and 4. Due to the switching delay, there is an extra clock at T5. The CS4# and its associated WR# signals are asserted at clock T6 instead of T5. The reason for this is that the data set up and hold times are determined with respect to the CS4# and/or WR# signals. Due to the extra clock at T5, the data presented to DRAM modules 3 and 4 starts at clock T6. To ensure the data set up and hold time are met, the CS4# and/or WR# signals are asserted at clock T6.

FIGS. 4A and 4B show that the use of the FET switches incurs one additional clock penalty for write cycles when DRAM module switching occurs. Since address crossing at boundaries from DRAM modules 1 and 2 to modules 3 and 4 occurs rarely, this additional penalty has negligible effect on the overall system performance.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a memory controller having a bus, the bus comprising a plurality of signal lines, the memory controller controlling a memory array, the memory array being divided into N groups of memory devices, each group having K memory devices, K memory devices in each of the N groups sharing memory signal lines; and
   a bi-directional field-effect transistor (FET) switch for switching connection between the bus and at least one of the N groups of the shared memory signal lines at different times in response to a switch control indication during a turn-around time of the K memory devices.

2. The apparatus of claim 1 wherein one group of the shared memory signal lines is coupled to the bus when the switch control indication is in a first state.

3. The apparatus of claim 2 wherein the other N−1 groups of the shared memory signal lines are coupled to N−1 loads.

4. The apparatus of claim 3 wherein each of the N−1 loads includes a bus keeper connected to one of ground and supply voltages.

5. The apparatus of claim 1 wherein the switch control indication is a signal which corresponds to a change in address space.

6. The apparatus of claim 1 wherein the shared memory signal lines are data lines.

7. The apparatus of claim 1 wherein the bus is a data bus.

8. The apparatus of claim 1 wherein the memory devices are random access memories.

9. The apparatus of claim 1 wherein the memory controller interfaces to a graphic controller.

10. The apparatus of claim 1 wherein the bi-directional FET switch comprises a FET.

11. A method for interfacing a memory array to a memory controller, the memory controller having a plurality of signal lines forming a bus, the memory array being divided into N groups of memory devices, each group having K memory devices, K memory devices in each of the N groups sharing memory signal lines, the method comprising:
   generating a switch indication to a bi-directional field-effect transistor (FET) switch; and
   switching the bi-directional FET switch to connect the signal lines to one of the N groups of shared memory signal lines, corresponding to groups of K memory devices that form the memory array, coupled to the signal lines by the FET switch, in response to a switch control indication during a turn-around time of the K memory devices.

12. The method of claim 11 wherein one group of the shared memory signal lines is coupled to the bus when the switch indication is in a first state.

13. The method of claim 12 wherein the other N−1 groups of the shared memory signal lines are coupled to N−1 loads.

14. The method of claim 13 wherein each of the N−1 loads includes a bus keeper connected to one of ground and supply voltages.

15. The method of claim 11 wherein the switch indication is a signal which corresponds to a change in address space.

16. The method of claim 11 wherein the shared memory signal lines are data lines.

17. The method of claim 11 wherein the bus is a data bus.

18. The method of claim 11 wherein the memory devices are random access memories.

19. The method of claim 11 wherein the memory controller interfaces to a graphic controller.

20. The method of claim 11 wherein the bi-directional FET switch comprises a FET.

* * * * *